(12) United States Patent
Krishnasamy et al.

(10) Patent No.: US 9,740,447 B1
(45) Date of Patent: Aug. 22, 2017

(54) METHOD AND APPARATUS FOR AUTOMATICALLY PRINTING DOCUMENTS FROM PORTABLE MEMORY DEVICE

(71) Applicant: Xerox Corporation, Norwalk, CT (US)

(72) Inventors: Muralidaran Krishnasamy, Tamil Nadu (IN); Narayan Kesavan, Tamil Nadu (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/221,674

(22) Filed: Jul. 28, 2016

(51) Int. Cl.
*G06F 3/12* (2006.01)
*H04N 1/00* (2006.01)
*G06K 15/02* (2006.01)
*H04N 1/21* (2006.01)
*G06K 15/00* (2006.01)

(52) U.S. Cl.
CPC ........... *G06F 3/1273* (2013.01); *G06K 15/02* (2013.01); *H04N 1/00411* (2013.01); *H04N 1/2166* (2013.01)

(58) Field of Classification Search
None
See application file for complete search history.

(56) References Cited

U.S. PATENT DOCUMENTS

| | | | |
|---|---|---|---|
| 5,860,066 A | 1/1999 | Rouse | |
| 5,969,826 A | 10/1999 | Dash et al. | |
| 7,844,749 B2 | 11/2010 | Tredoux et al. | |
| RE42,290 E | 4/2011 | Ogino | |
| 8,817,319 B2 | 8/2014 | Martin | |
| 9,009,359 B2 | 4/2015 | Ashok et al. | |
| 9,185,245 B2 | 11/2015 | Miyachi et al. | |
| 9,245,130 B2 | 1/2016 | Ashok et al. | |
| 9,245,131 B2 | 1/2016 | Ashok et al. | |
| 2005/0051942 A1 | 3/2005 | Kubo et al. | |
| 2006/0132841 A1 | 6/2006 | Park et al. | |
| 2006/0221372 A1 | 10/2006 | Onishi et al. | |
| 2007/0109600 A1 | 5/2007 | Ren et al. | |
| 2007/0229899 A1 | 10/2007 | Okuda | |
| 2008/0080001 A1* | 4/2008 | Yamada | H04N 1/00347 358/1.15 |
| 2009/0128862 A1 | 5/2009 | Nolepa et al. | |
| 2010/0231968 A1 | 9/2010 | Hirasawa et al. | |
| 2011/0242580 A1 | 10/2011 | Tran | |
| 2011/0292430 A1 | 12/2011 | Kang et al. | |
| 2012/0140266 A1 | 6/2012 | Takayama | |

(Continued)

*Primary Examiner* — Dov Popovici
(74) *Attorney, Agent, or Firm* — Fox Rothschild LLP

(57) ABSTRACT

A print device for automatically printing a document file from a portable memory device may include a port, a print engine, and a processing device. The processing device may detect that a portable memory device has become communicatively connected to the port, then access a print history from a data store and retrieve a print instruction, use the print history to determine that a document file in a designated folder of the portable memory device has not been printed, and automatically print the document file using the print engine based on the print instruction. After printing, the device may further transmit a communication to the data store to update the print history to reflect that the document file is printed. The print device may be capable of detecting an interruption and allowing a user to resume the print job later on the same print device or on another device.

22 Claims, 6 Drawing Sheets

(56) References Cited

U.S. PATENT DOCUMENTS

| | | |
|---|---|---|
| 2012/0194850 A1 | 8/2012 | K. et al. |
| 2012/0218605 A1 | 8/2012 | Yamada |
| 2012/0307316 A1 | 12/2012 | De Muelenaere et al. |
| 2013/0120799 A1 | 5/2013 | Maeda |

* cited by examiner

METHOD AND APPARATUS FOR AUTOMATICALLY PRINTING DOCUMENTS FROM PORTABLE MEMORY DEVICE

BACKGROUND

This disclosure relates to a system for automatically printing documents that are stored on a portable memory device with little or no user activation of a local user interface (LUI), other than to connect the portable memory device to a printer.

In performing a conventional print job in a document system or a multi-function peripheral (MFP), such as sending a file to the printer via network or plugging in a USB to a printer, a user normally needs to perform several steps. For example, in a normal print job in a networked environment, the user needs to send a print job from a computer and walk to the printer to retrieve the printed document. In another example, the user plugs into the printer a USB or other media card that stores documents to be printed. The user needs to use the LUI to browse the file directory on the USB card and select the files to be printed.

This document describes a system that may address at least some of the issues described above.

SUMMARY

In an embodiment, a print device may include a communication port for communicating with a data store containing a print history and obtaining information from the print history, a port for communicating with a portable memory device, a print engine, and a processing device communicatively coupled to the port and the print engine. The processing device may be programmed to detect a trigger event by determining that a portable memory device has become communicatively connected, wired or wirelessly, to the port and that the portable memory device contains a folder of a designated name. Upon detecting the trigger event, the processing device may access the print history from the data store and retrieve a print instruction, use the print history to determine that a document file in the folder of the designated name has not been printed, and automatically print the document file using the print engine based on the print instruction. After printing the document file, the processing device may further transmit a communication to the data store to update the print history to reflect that the document file is printed. In updating the print history, the processing device may send a communication to the data store to include the filenames that are in the folder but not in the print history and associate a timestamp with each included filename in the print history, where the timestamp indicates when the corresponding document file for each included filename is lastly printed.

In determining that the document file in the folder has not been printed, in one embodiment, the processing device may detect multiple filenames in the folder of the designated name, compare the filenames in the folder to the print history retrieved from the data store to identify whether any of the filenames in the folder are in the print history. If the filename of a document file does not exist in the print history, the processing device may determine that the document file has not been printed, otherwise determine that the document file has been printed. In another embodiment, if the filename of a document file does exist in the print history but the associated timestamp is earlier than the timestamp of the document file in the folder, which indicates that the document file in the folder has been modified since it was lastly printed, the device will determine that the document file has not printed, and will automatically print the document file.

Alternatively and/or additionally, if the device determines that a document file in the folder has already been printed, the device may prompt the user via a user interface to confirm that the user still wants to print the document file, and the device may then proceed to print the document file. Alternatively and/or additionally, the print device may have a user interface to allow a user to interrupt a print job and the print device can detect that a print job has been interrupted. Additionally, the device may also detect an interruption if the print device has run out of consumables. The processing device of the print device may then update the print history to include the filenames and, if available, associated timestamps for any documents that the print engine of the print device had printed before the print device was interrupted. This allows the print job to be resumed by the same print device at a later time or by any other print device on the network.

In one embodiment, once a first print device is interrupted, the user may communicatively connect the portable memory device to another print device. This second print device can detect that the portable memory device has been communicatively connected, subsequently retrieve the print history from the data store and compare the filenames in the folder of the portable memory device with the print history, and automatically print any document files in the folder that have not been printed earlier by the first print device. Alternatively and/or additionally, if the user re-connect the portable memory device to the same first print device at a later time after the first print device has been interrupted, the first print device may also use the print history and the print instruction to automatically print each document that would have been printed by the same print device if this print device had not been interrupted before the printing was complete.

DETAILED DESCRIPTION

Figure 1:
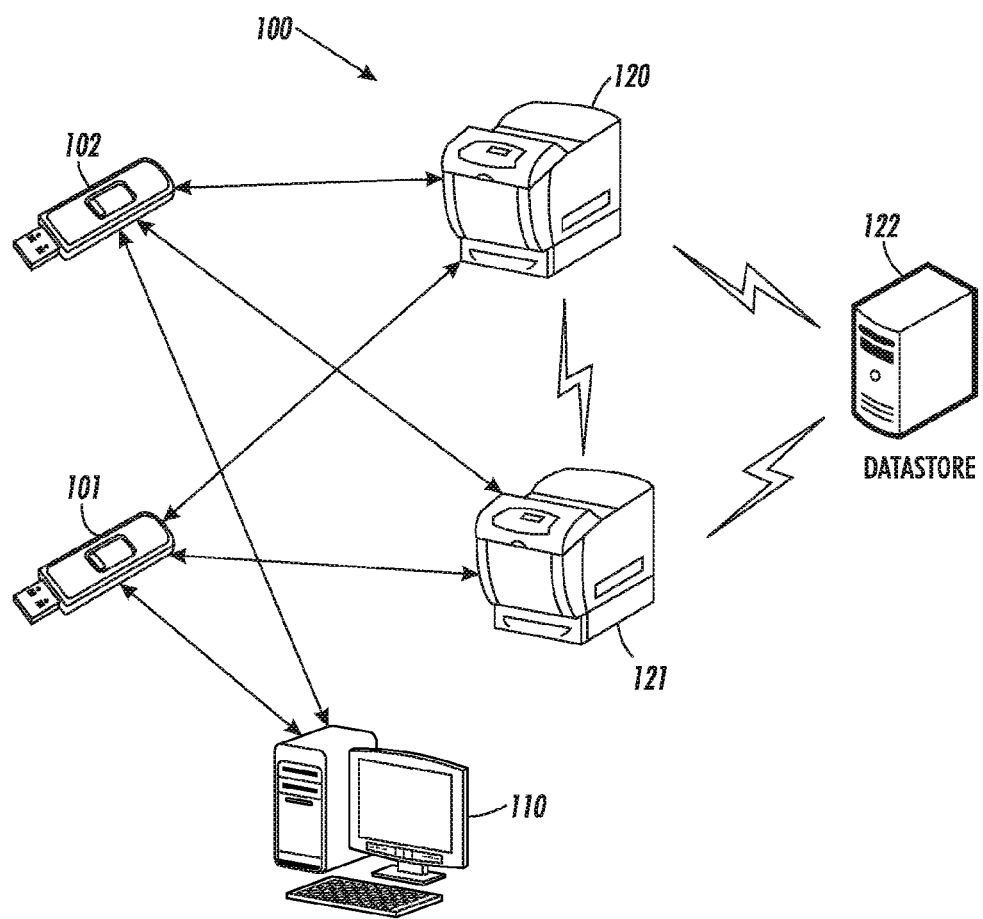
FIG. 1 illustrates a system for automatic printing of documents according to one embodiment.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

The term "local user interface" or "LUI" of a device refers to a user interface peripheral that is mounted to or built in an electronic device for users to perform various operations on the device. A local user interface typically includes a combination of hardware (such as a keyboard, keypad, touchsensitive display and/or microphone) and software for presenting prompts to a user and receiving input from the user via the hardware.

The term "automatically" refers to causing a machine to perform an action without requiring any user interaction, such as requiring the user to push a button or enter a command, before the machine will perform the action.

The term "portable memory device" refers to a portable device that has a non-transitory storage medium capable of storing data, such as a universal serial bus (USB) flash drive, a secure digital (SD) card or microSD card, a portable hard disk, a portable media player or any other external storage device that has such storing capability. In various embodiments, the portable memory device does not need to include a processor. The portable memory device will typically have a file system. The portable memory device will include a data transfer device, such as a USB connector for a USB drive, input/output ports of an SD card or a radio unit (transceiver) of a near-field communication device such as a Bluetooth device.

A "computer" or "computing device" refers to a device that includes a processor and non-transitory, computer-readable memory. The memory may contain program instructions that, when executed by the processor, cause the computing device to perform one or more operations according to the program instructions. Examples of computing devices include personal computers, servers, mainframes, gaming systems, televisions, and portable electronic devices such as smartphones, smart watches, wearable electronic devices, digital cameras, fitness tracking devices, tablet computers, laptop computers, media players and the like.

The term "physical document" refers to a hard-copy document on a substrate that is printed off of a printer or that can be scanned into a digital form. It may consist of a single sheet or a set of sheets.

The term "document system" refers to a system of devices that communicate with each other for handling document related jobs, in particular, printing, copying, electronic storing, facsimile, transmitting or receiving (including fax, email, or communicating with a remote device), and/or image scanning of a physical document.

The term "digital document file," "document file," "electronic document" or "electronic document file" refers to a digital representation of a document such as a word processor file, a PDF file, or a bitmap file (e.g. TIFF, JPG, PNG files etc.) that is stored in a computer readable memory or a storage medium. A document file may be an electronic representation of a physical document that contains one or multiple pages.

The term "print device" refers to a machine having hardware capable of receiving a digital document file and use the information from the file and associated print instructions to print the information from the file on a substrate and produce a physical document. Components of a print device typically include a print engine, which includes print hardware such as a print head, which may include components such as a print cartridge containing ink, toner or another print material, as well as a document feeding system configured to pass a substrate through the print device so that the print head can print characters and/or images on the substrate. In some embodiments, a print device may have additional capabilities such as scanning or faxing and thus may be a multifunction device.

A "print job" refers to a set of instructions that causes a print device to print one or more document files. In this document, the set of instructions may be from a user to a print device, or it may be generated by a system or the print device after detecting a trigger event.

With reference to FIG. 1, a document system 100 may include one or more print devices 120, 121, computers 110, one or more data stores 122, and/or communication links. Each print device 120, 121 is capable of reading a portable memory device 101, 102 for instant printing of a document file. The portable memory device 101, 102 may store on a designated folder, e.g. a folder with a designated filename such as "\Insta-print," a file with print instructions for the print device to perform various print jobs. The print device 120 may extract the print instructions from the portable memory device 101, 102 and print digital document files based on the print instructions. The designated folder of the portable memory device 101, 102 may also be used to store digital document files to be printed by one or more print devices 120, 121. In one embodiment, the print device 120 can detect a trigger event, e.g., a portable memory device is plugged into or otherwise communicatively connected to the print device, and/or the portable memory device contains a folder of the designated name. Then, in response to detecting the trigger event, a print job may be started. The print device may read the print instructions from the portable memory device 101, 102 or the default print instructions from the print device itself and instantly print all of the document files stored on the designated folder of the portable memory device.

Additionally, in one embodiment, the system may include a data store 122, which is a set of one or more computer-readable medium devices that stores a print history, which is updated whenever a print job is complete. In one embodiment, the data store 122 may be located remotely and accessible to any print device via a communication link. Alternatively, the data store 122 may be residing locally on the print device. In one embodiment, the print history may store a list of names of the document files that have been printed. The print history may be a general print history that applies to all users. In another embodiment, the print history may be associated with a user and stores information about the past print jobs of the user. When a new print job is started after detection of the trigger event, the print device may check the document files on the portable memory device against the print history and determine what documents files need to be printed. Then the print device may retrieve the document files to be printed from the portable memory device and automatically print them based on the print instructions.

Alternatively and/or additionally, the portable memory device 101, 102 may be pre-configured with default instructions by a computing device 110 via a web user interface (web-UI). Alternatively, the computing device 110 may be used to create the file system on the portable memory device. Additionally, the user may plug the portable memory device in a computer and re-configure the instructions at any time.

Figure 2:
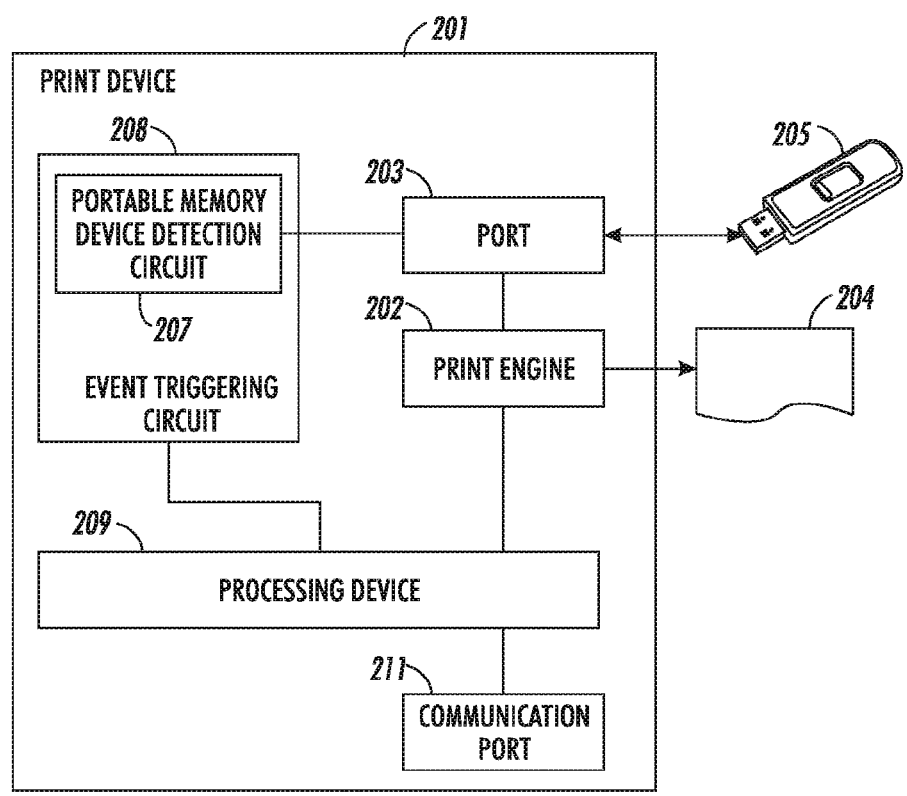
FIG. 2 illustrates a diagram of a print device according to one embodiment.

With reference to FIG. 2, various components in the document system are described in detail according to some embodiments. In one embodiment, the print device 201 may include a processing device 209 that is communicatively coupled to a print engine 202 and cause the print engine to print document files and produce the paper printouts 204. The processing device 209 may also be communicatively coupled to a communicate port 211 and cause the communicate port to communicate with a data store or other devices, wired or wirelessly.

The print device will automatically print the document files stored on any portable memory device that is connected or communicatively coupled to the print device, without user intervention. The print device may also include a port 203 for plugging in a portable memory device. Additionally, the print device may include an event triggering circuit 208 that triggers the print device to perform certain operations. The event triggering circuit may include a portable memory device detection circuit 207 that may be communicatively coupled to the port 203. When a portable memory device 205 is plugged into the port 203, the portable memory device detection circuit may detect the status change of the port and subsequently generate a trigger to the event trigger circuit, indicating that the user is initiating a new print job.

Alternatively and/or additionally, the print device may be capable of pairing with a portable memory device wirelessly, such as via Wi-Fi, Bluetooth or other near-field communication protocols. The event triggering circuit may also include a communication detection circuit that may be communicatively coupled to the communication port 211. The communication detection circuit may be capable of detecting when a portable memory device is communicatively coupled to the communication port 211 of the print device. In one embodiment, the communication port 211 may also be capable of communicating with a data store and allowing the print device to update and retrieve a print history in the data store. The print device will include program instructions that can cause the print device to automatically take certain actions in response to detecting that a memory device with a file storage folder of the designated name has been communicatively coupled or connected to the print device. This is further explained with reference to FIG. 3.

Figure 3:
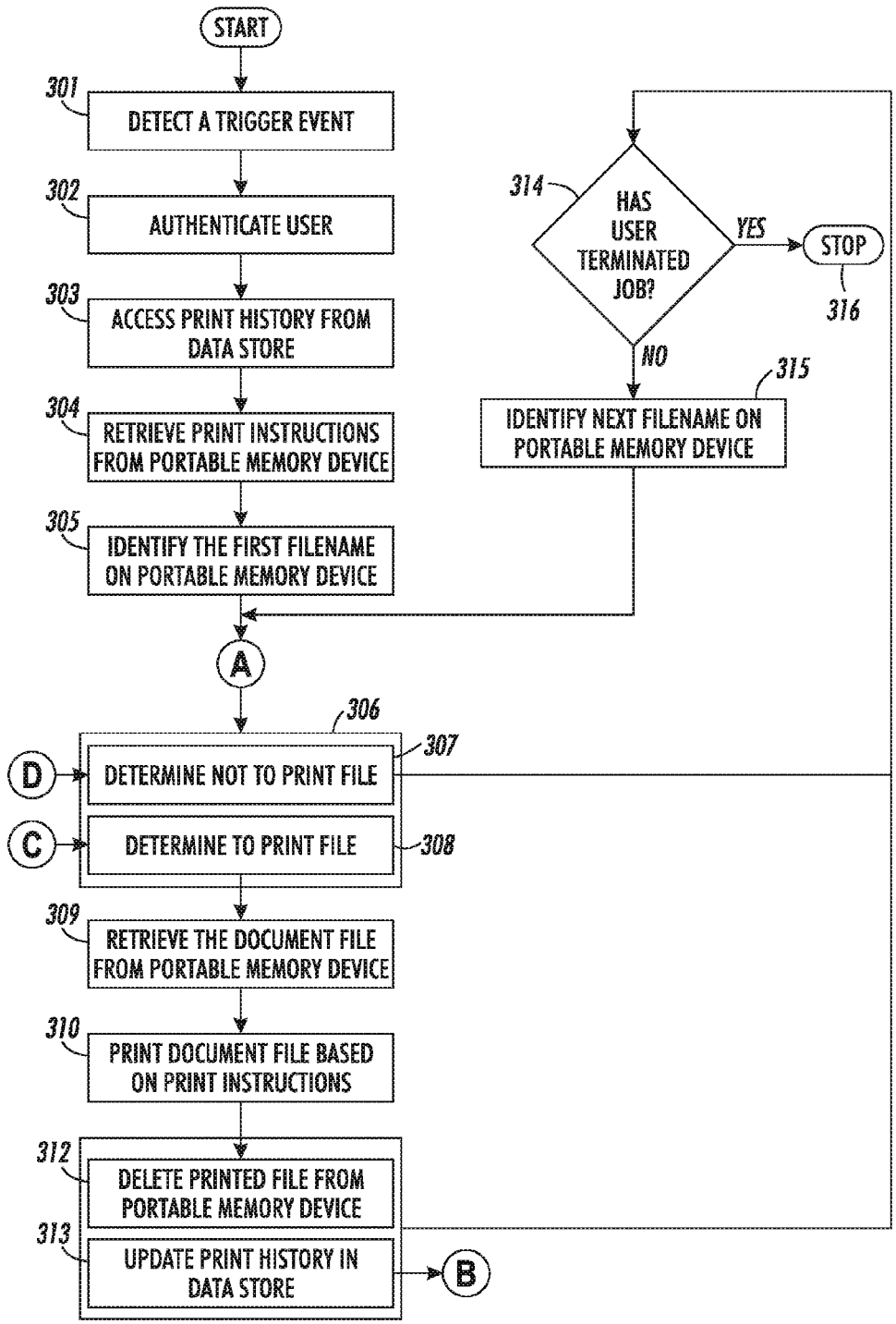
FIG. 3 is a diagram of automatic printing of documents according to one embodiment.

In FIG. 3, methods for accomplishing various tasks in the system disclosed in the embodiments in FIG. 2 are provided. In one embodiment, a method for automatic printing of a document may include detecting a trigger event 301 that is indicative that a user has initiated a print job. In one embodiment, detecting the trigger event may include receiving a trigger, indicating that a portable memory device is plugged into the port of the print device or communicatively connected to the print device. Once the print device detects the trigger event, the print device may authenticate the user 302, such as by prompting the user for a credential such as a username and password, and upon verification of the credential, the print device may access the print history associated with the user from the data store 303.

Additionally, the system may retrieve a print instruction from the portable memory device 304. In one example, a user has plugged a USB flash drive into the print device. The USB flash drive may have a designated folder, e.g. a file named "\insta-print" or any other name designated for storing document files to be printed. In one embodiment, the designated folder on the portable memory device may also be designated for storing the print instructions, such as orientation, margins, scaling, print resolution, effects, color management and finishing options. In one embodiment, the designated folder, the root of the portable memory device file directory, or a sub-folder thereof, may also be designated for storing the document files to be printed.

With further reference to FIG. 3, in one embodiment, the print instructions are contained in a print instruction file, such as in the XML format, and the print device may parse the XML print instruction file and extract relevant fields for print instructions. Alternatively and/or additionally, the print instructions may be stored in a non-transitory memory built in the print device. The print device may include program instructions that can retrieve the print instructions from a default file on the portable memory device (e.g. print-instruction.xml) or may use the default print instructions stored in the print device.

With further reference to FIG. 3, the print device may further retrieve the names of document files on the portable memory device 305, and determine which of the document files on the portable memory device are to be printed 306. In determining which document files to print, the print device may identify each of the retrieved filenames from the portable memory device and compare with the contents of the print history to determine whether the identified file needs to be printed. This process is further explained in detail, with reference to FIG. 4.

Figure 4:
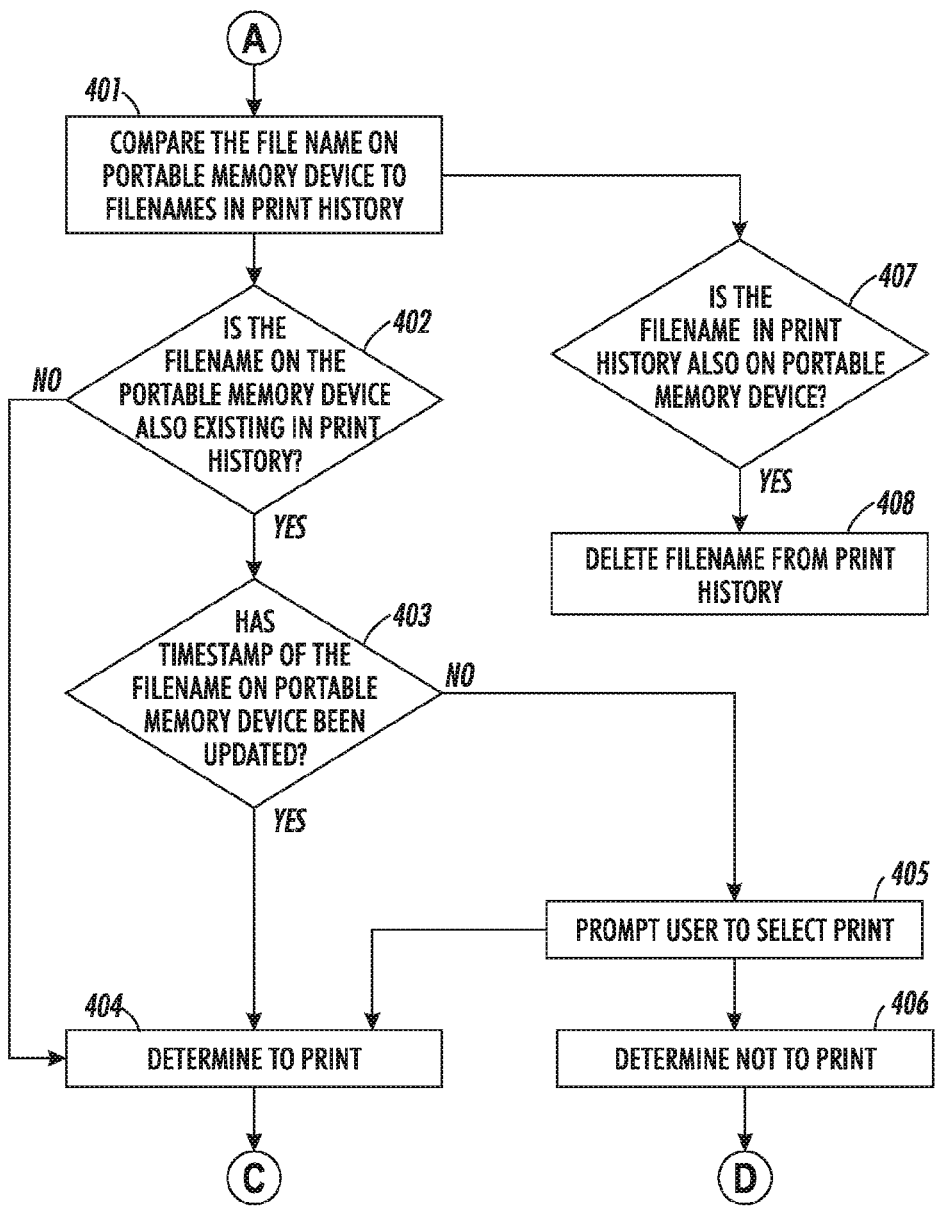
FIG. 4 is a diagram of automatic selection of documents to print according to one embodiment.

In FIG. 4, the print device will compare the identified filename of the document file on the portable memory device with the print history associated with the user 401. In one embodiment, the print device may access a data store remotely via the communication port (211 in FIG. 2), or a data store residing locally in the print device, and retrieve the print history associated with the user. In another embodiment, a general print history is stored in the data store and the print device may access the general print history from the data store. The print history may include the names of the document files that have been printed from previous print jobs, each name being associated with a timestamp. In one embodiment, the timestamp may include the timestamp of the time when the associated document file on the portable memory device was lastly printed. In one embodiment, the print history may be stored in the data store in any of the conventional format, such as in a file system of the operating system of the server or in a database structure, such as in a SQL database, or as a flat file.

With further reference to FIG. 4, the print device may check whether the filename of the document file on the portable memory device exists in the print history 402. If yes, the print device may determine that the document file on the portable memory device has already been printed before. The print device may further check whether the timestamp associated with the document file on the portable memory device has been updated since the last print job. In one embodiment, the device may compare the timestamp associated with the document file on the portable memory device with the timestamp associated with the filename in the print history 403. If the timestamp associated with the document file on the portable memory device is more recent than that associated with the filename in the print history, the device may determine that the document file on the portable memory device has been modified and thus may determine that the document file needs to be printed 404. Otherwise, the device may determine that the document file on the portable memory device has already been printed.

With further reference to FIG. 4, once the device determines that a document file on the portable memory device has already been printed before, the device may either determine not to print 406, or prompt the user to make a selection. For example, the device may display a message on the LUI to notify the user that a previously printed document is identified and ask the user whether to select to print 405. Depending on user's selection, the device may accordingly determine to print the document file 404 or not to print the document file 406.

Alternatively and/or additionally, the print device may also check the filenames in the print history to see if the corresponding files also exist in the portable memory device 407. If the filenames in the print history do not have corresponding files in the portable memory device, the print device may determine that the filenames in the print history are stale and therefore delete the filenames from the print history 408.

Returning to FIG. 3, once the device determines not to print the document file 307, the device may check the remaining files on the portable memory device 315 and repeat the same process as disclosed in the embodiments in FIG. 4. Alternatively, once the device determines to print document file 308, the device will retrieve the document files from the portable memory device 309 and print the document based on the print instructions 310.

Once the document file is printed, the device may delete the printed document file from the portable memory device. This is called auto-delete option and can be part of the print instruction. Alternatively and/or additionally, if the auto-delete option is not included in the print instruction, the device may proceed to update the print history in the data store 313, which is further described with reference to FIG. 5.

Figure 5:
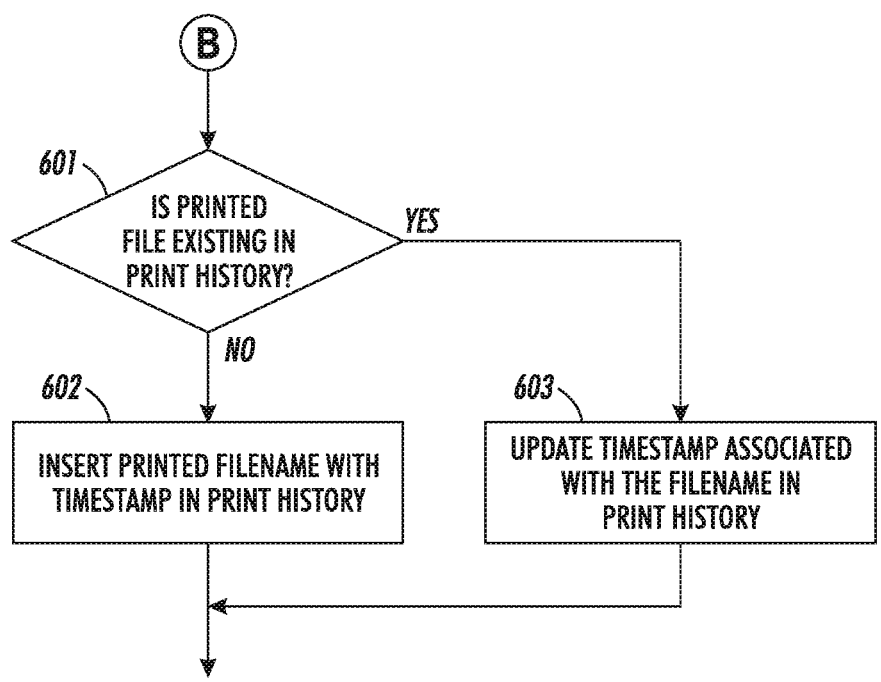
FIG. 5 is a diagram of updating a print history according to one embodiment.

In FIG. 5, the print device will check whether the filename of the printed document file on the portable memory device already exists in the print history 601. If the name of the printed document file does not exist in the print history, the device may insert the filename of the printed document file and the associated timestamp, which is the time the document file, was printed, on the portable memory device 602. If the filename of the printed document file already exists in the print history, it means that the printed document file has already been printed before. The device may update the timestamp associated with this filename in the print history with the time the document file was lastly printed 603.

Returning to FIG. 3, once the print history is updated, the print device may continue the same process for other remaining document files on the portable memory device 315. Alternatively and/or additionally, the device may allow the user to terminate a print job, for example, by making selections on the LUI or pushing a hard "Cancel" button on the device. In one embodiment, after each print job, the device may check whether a user has terminated a print job 314, and if the user has terminated a job, the device will stop 316; otherwise, the device will continue.

The embodiments described in FIGS. 1-5 can be implemented in various ways to accommodate various print tasks without the use of the LUI. For example, in one embodiment, a user may store one or more document files, e.g. five new document files (not printed earlier) in a designated folder, e.g. "\Insta-print" folder on a USB drive. The user plugs in the USB drive into a print device, the print device checks the user's print history and finds out that none of the document files in the "\Insta-print" folder has been printed earlier. The print device may determine to print the document files 402, 404 (in FIG. 4). The device may either use the default print instructions on the print device or retrieve the print instructions from the designated folder on the USB drive 304 (in FIG. 3). The device will then use the print instruction to print all the five document files from the "\Insta-print" folder 310. After printing, the print device may update the user's print history in the data store 313 by inserting five entries, each containing the filename of each of the printed document files, associated with a timestamp that indicates the time each document file was lastly printed 602 (in FIG. 5).

In one embodiment, after the print job is complete, the user may delete the five printed document files from the portable memory device, for example, via a computer. If the portable memory device is a media player, the user may delete the printed document files by using the graphical user interface on the portable memory device itself. The user may additionally place one or more new documents files, e.g. two new document files in the "\Insta-print" folder of the USB drive. The user then walks to the print device and plugs in the portable memory device, e.g. the USB drive into the device. The print device will detect that the USB drive is plugged in 303 (in FIG. 3), check the user's print history and determine that the existing five filenames in the user's print history are not in the "\Insta-print" folder on the USB drive 407 (in FIG. 4), and thus may remove the filenames in the print history 408. Alternatively and/or additionally, this can be done when updating the print history after printing the document files.

Additionally, the print device will also determine that the filenames of the two new document files on the USB drive are not in the print history, therefore determine to print 402, 404. The print device may proceed with printing the two new document files based on the print instructions 310 (in FIG. 3), that is retrieved from the portable memory device or the print device itself, and update the print history 313 after the print job is complete. In one embodiment, updating the print history may include inserting two new entries 602 (in FIG. 5) for the two new document files that have just been printed, each document file is associated with a timestamp reflecting the time the document file was printed.

In one embodiment, after the above job is complete, the user might delete the two existing document files on the portable memory device but place the earlier printed five documents in the "\Insta-print" folder. Once the portable memory is plugged into the print device and the print device detects the trigger event, the device may check the user's print history and determine that the previously stored two filenames do not exist in the designated folder of the portable memory device, thus delete these two filenames from the print history 407, 408 (in FIG. 4). Alternatively, this deleting step may also be done after the document file is printed, during the updating of the print history. The print device will also determine that the five replaced document files on the portable memory device do not exist in the print history, thus determine to print the five replaced document files from the portable memory device 402, 404.

The device may proceed printing the five document files based on the print instructions 310 (in FIG. 3), that is retrieved from the portable memory device or the print device itself, and update the print history in the data store 313. Now, the user's print history in the data store will have five entries of document filenames, each associated with a timestamp reflecting the time when each of the document files was lastly printed.

In one embodiment, after the above print job is complete, the user might fail to clean up the "\Insta-print" folder, or might deliberately intend to re-print the five document files. That is, the five printed document files are still stored in the "\Insta-print" folder of the portable memory device, with their timestamps being unchanged. The user can walk to the print device and plug-in the same portable memory device. The device will detect that the filenames of the five document files on the portable device all exist in the print history, and have not been modified because the timestamps for these files have not been updated since the last print 402, 403 (in FIG. 4). Hence, the print device may choose not to print these documents 406.

Alternatively and/or additionally, the print device may prompt the user to confirm whether the user wishes to print the document files again 405. If the user choses "Yes," the print device will print the document files 404; otherwise, the print device will not print the document files 406. In one embodiment, the device may prompt the user to confirm "Yes" or "No" altogether for all five document files. Alternatively, the device may prompt the user to confirm printing of the document files individually, allowing the user to print one document and not print the other. After the print is complete, the device may update the print history according to embodiments described in FIG. 5, that is, the print history will have the same five filenames, each with modified timestamps (if the document was printed), indicating when the document files was lastly printed.

In one embodiment, after the above print job is complete, the user may choose to update all the existing five document files present in the "\Insta-print" folder of the portable memory device with additional contents. After that, the user may walk to the print device and plug in the portable memory device. The device may determine that the user has made changes to the document files since the last time they were printed by determining that the five document files on the portable memory device also exist in the print history 402 but the timestamps of the document files on the portable memory device are more recent than those associated with the filenames in the print history 403. Thus, the device may determine to print the document files 404. After the print is complete, the device will update the print history in the manner as described in FIG. 5. Alternatively and/or additionally, not all, but some of the five document files were modified by the user, thus the print device may determine to print only those document files that have more recent timestamps than those associated with the corresponding filenames in the print history.

In some embodiments, when some, but not all of the document files on the portable memory device have been modified, the print device may determine to print the document files that have been modified (with more recent timestamp than those in the print history) 403, 404 (in FIG. 4). Alternatively and/or additionally, the print device may prompt the user to confirm whether to print those document files that have not been modified 405. In one embodiment, the device may prompt the user to confirm on individual document basis. In another document, the device may prompt the user to confirm in the batch mode, in which the user may select "Yes" or "No" only one time that applies to all remaining unmodified files. The print device may then proceed with printing the document files that are determined or selected by the user to be printed, based on the print instructions 310 (in FIG. 3), and then update the print history in the data store 313.

In some embodiment, the document printing system described in embodiments in FIG. 1 may allow user to switch between multiple print devices e.g. 120, 121, and complete a print job using multiple print devices. In one embodiment, when printing on one print device is interrupted before a print job is completed, the document printing system may allow the user to simply unplug the portable memory device and plug into another print device to pick up the print job. For example, the user may have placed multiple document files on the portable memory device, e.g. five document files, and plug in the portable memory device into a print device for printing. The print device may have printed the first two document files. During the printing of the third document file or before all of the five document files are printed, the print device may have stopped for some reason. The reason for print interruption may be that the print engine of the print device has run out of consumables (paper, toner, etc.) and is forced to stop; or the user has forcibly unplugged the portable memory device (e.g. the USB drive) from the print device.

At the moment the print job is interrupted, the print device will update the print history to bring it up to date. In one embodiment, the print device may be configured to update the print history after each document file is printed. In such a case, when the print job is interrupted, the print history will already be up to date. Alternatively and/or additionally, the print device may be configured to update the print history after the entire print job is complete. In such a case, the print device may update the print history with the filenames and associated timestamps for all documents that have been printed right before the print job is interrupted.

When the user unplugs the portable memory device due to a print job interruption, and plugs in the same portable memory device into a second print device, the second print device may immediately detect that a portable memory device is plugged in 301 (in FIG. 3), and subsequently access the print history associated with the user from the data store 303 via the network, retrieve the print instructions and filenames from the portable memory device 304, 305 and determine which document files to print 306. Because the print history reflects the entire print operations before the first print device was stopped, by reading the print history, the second print device will be able to resume the printing of the remaining document files on the portable memory device that would have been printed by the first print device if the previous print job had not been interrupted. After the remaining document files are printed, the second print device may update the print history in the same manner described in embodiments in FIG. 5.

In some embodiments, as in the above print job, the print device may allow the user to voluntarily interrupt a print job. For example, the user may select a "Stop remaining jobs" option on the LUI, and continuing at a later time. In another example, the user may simply unplug the portable memory device from the print device and walk away. In one embodiment, the print device may detect that the user has interrupted the print job before all of the document files are printed. The print device will then update the print history via the network in the manner described above in this document.

When, at a later time, the user plugs in the USB once again in the same print device, as described in embodiments in FIG. 3, the same print device may detect that a portable memory device is plugged in 301 (in FIG. 3), access the print history from the data store via the network 303, retrieve the print instructions from the portable memory device 304 and determine which document files on the portable memory device to print based on the print history 306. As described earlier in this document, the print device will determine which documents files have not been printed from the interrupted print job from reading of the print history, and will resume printing the remaining documents that would have been printed by the print device if the print job had not been interrupted. Alternatively and/or additionally, the document printing system may allow the user to plug in the USB in a different print device and pick up the uncompleted print job from that different print device as described earlier.

Figure 6:
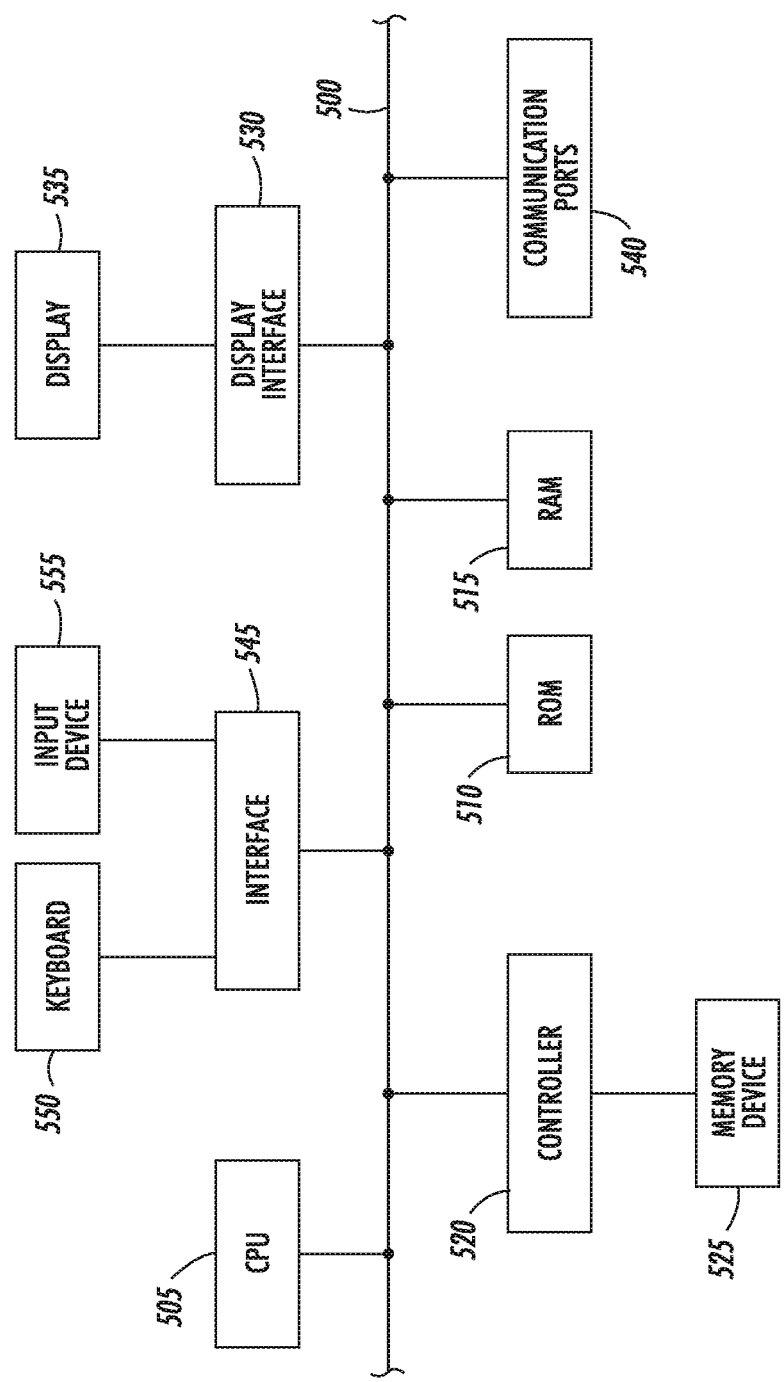
FIG. 6 is a block diagram of elements of a computing device on which the various systems and methods in this document could be implemented.

FIG. 6 depicts an example of internal hardware that may be included in any of the electronic components of the system, the print device or another device in the system such as the system 120, 121 (in FIG. 1). An electrical bus 500 serves as an information highway interconnecting the other illustrated components of the hardware. Processor 505 is a central processing device of the device, configured to perform calculations and logic operations required to execute programming instructions. As used in this document and in the claims, the terms "processor" and "processing device"

may refer to a single processor or any number of processors or processor cores in one or more processors. The device may include read only memory (ROM) 510, random access memory (RAM) 515, or other types of memory devices, such as flash memory, hard drives and other devices capable of storing electronic data. A memory device may include a single device or a collection of devices across which data and/or instructions are stored.

An optional display interface 530 may permit information from the bus 500 to be displayed on a display device 545 in visual, graphic or alphanumeric format. An audio interface and audio output (such as a speaker) also may be provided. Communication with external devices may occur using various communication ports or devices 540 such as a portable memory device reader/writer, a transmitter and/or receiver, an antenna, an RFID tag and/or short-range or near-field communication circuitry. The communication device 540 may be attached to a communications network, such as the Internet, a local area network or a cellular telephone data network.

The hardware may also include a user interface sensor 545 that allows for receipt of data from input devices 550 such as a keyboard, a mouse, a joystick, a touchscreen, a remote control, a pointing device, a video input device (camera) and/or an audio input device (microphone). Various methods of activation, validation and/or authorization described in this document may be performed by the central processing device 505 or a controller 520.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

The invention claimed is:

1. A document printing system, comprising:
   a data store containing a print history;
   a first print device comprising:
   a communication port for communicating with the data store and obtaining information from the print history,
   a port for communicating with a portable memory device,
   a print engine,
   a processing device communicatively coupled to the port and the print engine, and
   a non-transitory, computer-readable medium containing program instructions that are configured to cause the processing device to:
   detect a trigger event by determining that the portable memory device has become communicatively connected to the port and that the portable memory device contains a folder of a designated name,
   upon detecting the trigger event, access the print history from the data store and retrieve a print instruction,
   use the print history to determine that a document file in the folder of the designated name has not been printed,
   automatically cause the print engine to print the document file based on the print instruction, and
   transmit a communication to the data store to update the print history to reflect that the document file is printed.

2. The system of claim 1, wherein the program instructions for determining that the document file in the folder has not been printed comprise program instructions that are configured to cause the processing device to:
   detect a plurality of filenames in the folder of the designated name;
   compare the filenames in the folder to the print history to identify whether any of the filenames are in the print history; and
   determine that the document file has not been printed if a filename of the document file does not exist in the print history, otherwise determine that the document file has been printed;
   wherein the communication to update the print history comprises a communication to, after printing is complete, update the print history to include the filenames that are in the folder but not in the print history.

3. The system of claim 1, further comprising additional program instructions that are configured to cause the processing device to:
   detect a plurality of filenames in the folder;
   compare the filenames in the folder to the print history to identify whether the print history includes any filenames that are not in the folder; and
   update the print history to delete any of the filenames that are in the print history but not in the folder.

4. The system of claim 1, wherein the communication to the data store to update the print history to reflect that the document file is printed comprises a communication to:
   include filenames that are in the folder but not in the print history; and
   associate a timestamp with each included filename in the print history, wherein the timestamp indicates when a corresponding document file for each included filename is lastly printed.

5. The system of claim 1, wherein:
   the first print device also comprises a user interface configured to present information to a user and receive information from the user; and
   the system also includes additional program instructions that are configured to cause the processing device to, for any document file in the folder that has been determined to have been printed, cause the user interface to output a prompt that, if activated, permits the user to instruct the system to cause the print engine to print that document file.

6. The system of claim 4, wherein the program instructions for determining that the document file in the folder has been printed comprise program instructions that are configured to cause the processing device to:
   detect a plurality of filenames in the folder of the designated name;
   compare the filenames in the folder to the print history to identify whether any of the filenames are in the print history, wherein each filename in the folder is associated with a timestamp indicating when the corresponding document file has been lastly modified; and
   determine that the document file has not been printed if:
   the filename of the document file does not exist in the print history, or
   the filename of the document file exists in the print history and an associated timestamp in the print history is earlier than the timestamp associated with the filename in the folder,
   otherwise, determine that the document file has been printed.

7. The system of claim 6, wherein:
the first print device also comprises a user interface configured to present information to a user and receive information from the user; and
the system also includes additional program instructions that are configured to cause the processing device to, for any document file in the folder that has been determined to have been printed, cause the user interface to output a prompt that, if activated, permits the user to instruct the system to cause the print engine to print that document file.

8. The system of claim 2, further comprising:
a second print device having a communication port for communicating with the data store, a port for communicating with the portable memory device, a print engine, and a processing device; and
additional program instructions that are configured to cause the processing device of the first print device to:
  detect that the first print device been interrupted before the printing was complete, and
  update the print history to include the filenames and, if available, associated timestamps for any documents that the print engine of the first print device printed before the first print device has been interrupted; and
additional program instructions that are configured to cause the processing device of the second print device to:
  detect the portable memory device has become communicatively connected to the port of the second print device and that the portable memory device contains the folder of the designated name,
  access the print history from the data store and automatically retrieve a print instruction, and
  automatically cause the print engine of the second print device to use the print history and the print instruction to print each document file that would have been printed by the first print device if the first print device had not boon interrupted before the printing was complete.

9. The system of claim 8, wherein the program instructions for detecting that the first print device was interrupted before the printing was complete comprise program instructions configured to cause the processing device of the first print device to:
  detect that the portable memory device has become disconnected from the port of the first print device; or
  detect that the first print device has run out of consumables.

10. The system of claim 2, further comprising:
additional program instructions that are configured to cause the processing device of the first print device to:
  detect that the first print device was interrupted before the printing was complete;
  update the print history to include the filenames and, if available, associated timestamps for any documents that the print engine of the first print device printed before the first print device was interrupted;
  detect the portable memory device has become reconnected to the port of the first print device and that the portable memory device contains the folder of the designated name;
  access the print history from the data store and automatically retrieve a print instruction; and
  automatically cause the print engine of the first print device to use the print history and the print instruction to print each document that would have been printed by the first print device if the first print device had not been interrupted before the printing was complete.

11. The system of claim 1, further comprising additional program instructions to:
  determine whether an auto-delete function has been activated; and
  if the auto-delete function has been activated, cause the processing device to automatically delete the document file from the portable memory device after the printing is complete, otherwise permit the document file to remain on the portable memory device after the printing is complete.

12. A first print device, comprising:
a communication port for communicating with a data store containing a print history and obtaining information from the print history;
a port for communicating with a portable memory device;
a print engine;
a processing device communicatively coupled to the port and the print engine; and
a non-transitory, computer-readable medium containing program instructions that are configured to cause the processing device to:
  detect a trigger event by determining that the portable memory device has become communicatively connected to the port and that the portable menxory device contains a folder of a designated name,
  upon detecting the trigger event, access the print history from the data store and retrieve a print instruction,
  use the print history to determine that a document file in the folder of the designated name has not been printed,
  automatically cause the print engine to print the document file, based on the print instruction, and
  transmit a communication to the data store to update the print history to reflect that the document file is printed.

13. The device of claim 12, wherein program instructions for determining that the document file in the folder has not been printed comprise program instructions that are configured to cause the processing device to:
  detect a plurality of filenames in the folder of the designated name;
  compare the filenames in the folder to the print history to identify whether any of the filenames are in the print history; and
  determine that the document file has not been printed if a filename of the document file does not exist in the print history, otherwise determine that the document file has been printed;
  wherein the communication to update the print history comprises a communication to, after printing is complete, update the print history to include the filenames that are in the folder but not in the print history.

14. A method for automatically printing a document in a document printing system, comprising:
  detecting, by a processing device of a first print device, a trigger event by determining that a portable memory device has become communicatively connected to a port of the first print device and that the portable memory device contains a folder of a designated name;
  upon detecting the trigger event, accessing by the processing device, a print history from a data store via a communication port of the first print device and retrieve a print instruction from the print history;

using, by the processing device, the print history to determine that a document file in the folder of the designated name has not been printed;

by the processing device, automatically causing a print engine of the first print device to print the document file based on the print instruction; and transmitting, by the processing device, a communication to the data store to update the print history to reflect that the document file is printed.

15. The method of claim 14, wherein determining that the document file in the folder has not been printed comprises:

detecting, by the processing device, a plurality of filenames in the folder of the designated name;

comparing, by the processing device, the filenames in the folder to the print history to identify whether any of the filenames are in the print history; and determining that the document file has not been printed if filename of the document file does not exist in the print history, otherwise determining that the document file has been printed;

wherein the communication to update the print history comprises a communication to, after printing is complete, update the print history to include the filenames that are in the folder but not in the print history.

16. The method of claim 14 further comprising:

detecting, by the processing device, a plurality of filenames in the folder;

comparing, by the processing device, the filenames in the folder to the print history to identify whether the print history includes any filenames that are not in the folder; and updating, by the processing device, the print history to delete any of the filenames that are in the print history but not in the folder.

17. The method of claim 14, wherein the communication to the data store to update the print history to reflect that the document file is printed comprises a communication to:

include filenames that are in the folder but not in the print history; and associate a timestamp with each included filename in the print history, wherein the timestamp indicates when a corresponding document file for each included filename is lastly printed.

18. The method of claim 14 further comprising:

by the processing device, presenting information to a user and receiving information from the user via a user interface of the first print device; and for any document file in the folder that has been determined to have been printed, outputting via the user interface, by the processing device, a prompt that, if activated, permits user to instruct the print engine to print that document file.

19. The method of claim 17, wherein determining that the document file in the folder has been printed comprises:

detecting, by the processing device, a plurality of filenames in the folder of the designated name;

comparing, by the processing device, the filenames in the folder to the print history to identify whether any of the filenames are in the print history, wherein each filename in the folder is associated with a timestamp indicating when the corresponding document file has been lastly modified; and determining, by the processing device, that the document file has not been printed if:

the filename of the document file does not exist in the print history, or the filename of the document file exists in the print history and an associated timestamp in the print history is earlier than the timestamp associated with the filename in the folder, otherwise, determining that the document file has been printed.

20. The method of claim 19, wherein:

presenting, by the processing device, information to the user and receiving information from the user via a user interface of the first print device;

for any document file in the folder that has been determined to have been printed, by the processing device, outputting by the processing device, a prompt that, if activated, permits a user to instruct the print engine to print that document file.

21. The method of claim 15 further comprising:

detecting, by the processing device of the first print device, that the first print device has been interrupted before the printing was complete;

updating the print history to include the filenames and, if available, associated timestamps for any documents that the print engine of the first print device printed before the first print device has been interrupted;

detecting, by a processing device of a second print device, the portable memory device has become communicatively connected to a port of the second print device and that the portable memory device contains the folder of the designated name;

accessing, by the processing device of the second print device, the print history from the data store and automatically retrieving a print instruction from the print history; and automatically causing a print engine of the second print device to use the print history and the print instruction to print each document file that would have been printed by the first print device if the first print device had not been interrupted before the printing was complete.

22. The method of claim 14, further comprising:

determining, by the processing device, whether an auto-delete function has been activated; and if the auto-delete function has been activated, automatically deleting, by the processing device, the document file from the portable memory device after the printing is complete, otherwise permitting the document file to remain on in the portable memory device after the printing is complete.

* * * * *